(12) United States Patent
Ernst et al.

(10) Patent No.: US 12,579,312 B2
(45) Date of Patent: Mar. 17, 2026

(54) SYSTEMS AND METHODS FOR SEGREGATED COLLECTION AND STORAGE OF SENSITIVE DATA

(71) Applicant: JPMORGAN CHASE BANK, N.A., New York, NY (US)

(72) Inventors: Kelly Patrick Ernst, Wilmington, DE (US); Howard Spector, Street, MD (US); Matthew Baker, Worthington, OH (US); Xinyi Xu, Northbrook, IL (US); Steve M Piatt, Dublin, OH (US); Deepak Kheterpal, Galena, OH (US); Rajesh Ganapathy, Powell, OH (US); Arunava Mitra, Lewis Center, OH (US); Michael R Hack, Hillsborough, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 55 days.

(21) Appl. No.: 18/647,498

(22) Filed: Apr. 26, 2024

(65) Prior Publication Data

US 2024/0362364 A1     Oct. 31, 2024

Related U.S. Application Data

(60) Provisional application No. 63/499,030, filed on Apr. 28, 2023.

(51) Int. Cl.
*G06F 21/62* (2013.01)
*G06Q 40/03* (2023.01)

(52) U.S. Cl.
CPC ......... *G06F 21/6254* (2013.01); *G06Q 40/03* (2023.01)

(58) Field of Classification Search
None
See application file for complete search history.

(56) References Cited

U.S. PATENT DOCUMENTS

| | | | |
|---|---|---|---|
| 11,698,979 B2 * | 7/2023 | Hamel | H04L 9/30 |
| | | | 713/193 |
| 2020/0236103 A1 * | 7/2020 | Dawkins | H04L 63/0823 |
| 2024/0112177 A1 * | 4/2024 | Maier | G06Q 40/00 |
| 2024/0291863 A1 * | 8/2024 | Cohen | H04L 63/1425 |

* cited by examiner

*Primary Examiner* — Nelson S. Giddins
(74) *Attorney, Agent, or Firm* — GREENBERG TRAURIG LLP

(57) ABSTRACT

A method may include: an originating system receiving decisioning data from an applicant as part of an application for a product, the originating system redirecting the applicant to a sensitive data capture computer program; the sensitive data capture computer program receiving a unique identifier from the originating system; the sensitive data capture computer program receiving the sensitive data from the applicant, wherein the originating system does not have access to the sensitive data; the sensitive data capture computer program associating the sensitive data with the unique identifier; a matching computer program receiving a decision from the originating system on the application and the unique identifier; the matching computer program receiving the sensitive data and the unique identifier from the sensitive data capture computer program and matching the sensitive data and the decision using the unique identifier; and a compliance reporting program generating a report using the match.

20 Claims, 3 Drawing Sheets

100

Compliance Reporting systems (140)

Matching computer program (130)

Decisioning Systems (120)

Origination System(s) (110)

Sensitive Data Capture System (115)

Applicant Or Customer

SYSTEMS AND METHODS FOR SEGREGATED COLLECTION AND STORAGE OF SENSITIVE DATA

RELATED APPLICATIONS

This application claims priority to, and the benefit of, U.S. Provisional Patent Application Ser. No. 63/499,030, filed Apr. 28, 2023, the disclosure of which is hereby incorporated, by reference, in its entirety.

BACKGROUND OF THE INVENTION

1. Field of the Invention

Embodiments are generally directed to systems and methods for segregated collection and storage of sensitive data.

2. Description of the Related Art

Government regulatory schemes in many jurisdictions require that certain applicant or customer data not be used in various decision-making processes of private firms. This scenario is highlighted in the financial services industry, where equal credit opportunity and fair lending regulations proscribe financial institutions from using applicant data related to protected statuses (such as race, gender, age, sexual orientation, etc.) from being considered in the loan-making process. Other regulations, however, mandate that certain applicant data be retained for reporting purposes. For instance, the Dodd-Frank Wall Street Reform and Consumer Protection Act of 2010 has been recently amended to require financial institutions to compile, maintain, and submit certain demographic data associated with applicants for credit made by, e.g., women-owned, minority-owned, and small businesses.

A financial institution must be able to show regulators that the applicant data associated with protected statuses is not used in certain regulated decision-making processes, such as loan decisioning. For example, a financial institution is mandated to make reports to regulatory agencies concerning sensitive data with respect to protected demographics. Accordingly, while organizations must collect sensitive, protected demographic applicant data required for reporting, such applicant data should not be collected or stored side-by-side with applicant data that is used in regulated decision-making processes. Technical challenges arise, however, in the collection, storage, usage, and reporting of sensitive applicant data in a manner that meets all applicable regulatory standards.

SUMMARY OF THE INVENTION

Systems and methods for segregated collection and storage of sensitive data are disclosed. In one embodiment, a method may include: (1) receiving, at an originating system computer program, decisioning data from an applicant as part of an application for a product; (2) generating, by the originating system computer program, a unique identifier for the applicant; (3) redirecting, by the originating system computer program, the applicant to a sensitive data capture computer program with the unique identifier; (4) receiving, by the sensitive data capture computer program, sensitive data from the applicant, wherein the originating system computer program does not have access to the sensitive data; (5) associating, by the sensitive data capture computer program, the sensitive data with the unique identifier; (6)

receiving, by a matching computer program, a decision on the application from a decisioning system and the unique identifier; (7) receiving, by the matching computer program, the sensitive data and the unique identifier from the sensitive data capture computer program; (8) matching, by the matching computer program, the sensitive data and the decision using the unique identifier; and (9) generating, by a compliance reporting program, a report using the match.

In one embodiment, the decisioning data may be received at a first uniform resource locator (URL) and the sensitive data may be received at a second URL. In one embodiment, the originating system computer program provides the second URL in a machine-readable code.

In one embodiment, the decisioning data may include income information for the applicant.

In one embodiment, the sensitive data may include a race of the applicant and/or a gender of the applicant.

In one embodiment, the unique identifier may include a hash of a social security number for the applicant.

In one embodiment, the method may also include anonymizing, by the sensitive data capture computer program, at least some of the sensitive data.

In one embodiment, the method may also include encrypting, by the sensitive data capture computer program, at least some of the sensitive data.

In one embodiment, the decision may include an approval or rejection of the application, an approved loan amount or an approved line of credit amount, etc.

In one embodiment, the application may be for a loan.

According to another embodiment, a system may include: an originating system configured to receive decisioning data from an applicant as part of an application for a product and to generate a unique identifier for the applicant; a sensitive data capture system configured to receive a redirect from the originating system with the unique identifier, to receive sensitive data from the applicant, wherein the originating system does not have access to the sensitive data, and to associate the sensitive data with the unique identifier; a decisioning system that may be configured to decision the application based on the decisioning data; a matching computer program that may be configured to receive the decision on the application with the unique identifier from the decisioning system, to receive the sensitive data with the unique identifier from the sensitive data capture system, and to match the sensitive data and the decision using the unique identifier; and a compliance reporting computer program that may be configured to generate a compliance report using the match.

In one embodiment, the decisioning data may be received at a first uniform resource locator (URL) and the sensitive data may be received at a second URL.

In one embodiment, the originating system may be configured to provide the second URL in a machine-readable code.

In one embodiment, the decisioning data may include income information for the applicant, and the sensitive data may include a race of the applicant and/or a gender of the applicant.

In one embodiment, the unique identifier may include a hash of a social security number for the applicant.

In one embodiment, the sensitive data capture system may also be configured to anonymize at least some of the sensitive data.

In one embodiment, the sensitive data capture system may also be configured to encrypt at least some of the sensitive data.

In one embodiment, the decision may include an approval or rejection of the application.

In one embodiment, the decision may also include an approved loan amount or an approved line of credit amount.

According to an embodiment, a method may include: providing a signed uniform resource locator (URL) to a data provider, wherein the signed uniform resource locator includes a reference to a resource, a time constraint, and a unique identifier; receiving, at the resource, sensitive data; storing the data with an association with the unique identifier; receiving production data at the resource, wherein the production data is associated with the unique identifier; unifying the sensitive data with the production data, wherein the unifying creates a unified data set; and executing a process on the unified data set.

In one embodiment, the process may be a reporting process.

In one embodiment, the sensitive data may be encrypted.

In one embodiment, the production data may be encrypted.

In one embodiment, the production data and the sensitive data may be encrypted using homomorphic encryption.

In one embodiment, the process is executed on the encrypted data, and an output of the process may be encrypted.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION

Figure 1:
FIG. 1 depicts a system for segregated capture and storage of sensitive data, in accordance with an embodiment.

Systems and methods for segregated collection and storage of sensitive data are disclosed.

While regulatory schemes with respect to financial organizations are used as exemplary scenarios throughout the disclosure, there are many other use cases for the techniques described herein. For instance, any use case where it is desirable to segment collection and storage of a certain type of data from a broader collection of data, yet still be able to effectively use and report on the data as a unified collection may utilize aspects described herein. Embodiments may additionally be used for data quality management, access control management, etc.

As used herein, a sensitive data collection system or computer program may be a secondary platform provided by an organization for segregating the collection and storage of sensitive data that an organization, for any reason (e.g., for regulatory reasons), may wish to collect and store completely separately from other (e.g., production) data.

In embodiments, the organization may employ a human actor, such as an agent, in a role associated with the collection of sensitive data, to avoid using personal digital devices, individual workstations, etc. The use of personal devices may allow an agent to see and/or record sensitive data or may promote a perception that sensitive data will be incorporated into a decisioning process, even if that is not the intent or the reality.

Instead of capturing sensitive data during the main acquisition flow (e.g., at an organization's branch office, in an on-line application process, etc.), embodiments may generate a unique identifier that may be associated with an applicant or customer. The unique identifier may be stored with an associated account, a user profile, a customer file, etc.). For example, the unique identifier may include a one-way hash of the applicant or customer social security number (SSN) or taxpay identification number (TIN), along with a new account number or tracking number that may be used during an acquisition process. A one-way function, or "hash," is exemplary, and the actual fields may use other masking or cryptographic techniques. Embodiments may include any technique that allows a capture process or sensitive data access application to recreate unique identifier in order to validate it without having to interface with other organizational systems.

A unique identifier value may be delivered to a data provider in any suitable manner, such as providing a QR code, a push notification in an application (e.g., a mobile application), an SMS (text) message, etc. After receipt the data provider may use their device to complete the survey.

In one embodiment, the unique identifier may be provided with a signed Uniform Resource Locator (URL). Signing a URL may allow an organizational system to ensure that access is valid and further allows for anonymous access to a system, since there is no need to log in to an organization's systems to provide data. The approach may also work for a logged-in data provider, since the applicant or customer may re-request a signed URL and be redirected to a capture process anonymously (e.g., outside of the context of the session with the applicant or customer and the other organizational systems).

Referring to FIG. 1, a system for segregated capture and storage of sensitive data is disclosed according to an embodiment. System 100 may include one or more origination systems 110 over which an applicant or customer may interact with an organization, such as a financial institution, in order to apply for a product, such as a loan or credit card, to open an account, etc.

Origination system(s) 110 may be any technological system or platform that is provided by a providing organization to perform a primary function of the organization. Origination system(s) 110 may execute a computer program that may collect and process production data for carrying out the organization's business goals. An exemplary origination system 110 for a financial institution may be a loan processing and/or decisioning system or an account ledger system; an exemplary origination system 110 for an accounting organization may be a tax calculation system, or a bookkeeping system, and so on.

Origination system 110 may include in-person systems (e.g., interaction with a teller or employee), kiosks, websites, applications, etc.

The applicant or customer may be a human actor, or it may be a corresponding technological system that provides decisioning data and sensitive data through a programmatic interface, such as a published application programming interface (API), an event steaming interface, or any other suitable electronic interface.

As part of the application process, the applicant or customer may submit decisioning data (e.g., data that may be used for decisioning an applicant, or for other purposes, such as income, liabilities, etc.) and sensitive data to the organization. Sensitive data may include, for example, regulated demographic data, personal information, payment information, or any other category of data that an organization is mandated, or voluntarily undertakes, to segregate from a broader collection of data.

The applicant or customer may input the decisioning data into an electronic form, e.g., a web form or a form generated by an application, such as a mobile application. The electronic form may be published by a web server, or associated with an application server, of an organization. For example, the web form may be provided by the organization and may receive decisioning data from the applicant or customer.

The electronic form may be provided to the applicant or customer via a signed URL that may include a permission level and a time limit with respect to a resource and/or a resource request. The applicant or customer may not have or require a user profile with a providing organization but may still have access to a resource controlled or referenced by a signed URL.

The included permission level may provide access control for a resource that is requested by the URL. For instance, the signed URL may assign "CRUD" (create, write, update, delete) or finer-grained permissions to a resource associated with the URL. Moreover, the signed URL may include a time constraint that expires after a certain amount of time. After expiration of the time constraint the resource may not be granted access to the associated resource, effectively making the permissions granted in the URL temporary.

In embodiments, the signed URL may include the unique identifier that limits re-submission or distributed denial of Service (DDoS) type cyberattacks from the URL. The unique identifier may take the form of an anonymized data provider token. Such a token may be generated by a token generation service either internal or external to a providing organization. The token may be assigned to decisioning data that is associated with the applicant or customer and that is collected or stored by origination system(s) 110 and to sensitive data that is captured by a computer program executed by sensitive data capture system 115. The computer program that may receive the sensitive data at a URL or via an application.

In one embodiment, the collection of the decisioning data and the sensitive data is done such that originating system 110 does not receive or otherwise have access to the sensitive data, and cannot use the sensitive data in its decisioning process.

Matching computer program 130 may use the unique identifier or token as a lookup key to correlate the decisioning data received by system 110 to sensitive collected by sensitive data capture system 115.

In one embodiment, upon prompting a browser or application executed by an electronic device at origination system(s) 110 to send the decisioning data collected from the applicant or customer in the web form, the browser or application may send the decisioning data to a hosting web server via a URL and appropriate protocols (e.g., TCP/IP, HTTP, SSL and/or other appropriate protocols at various network layers).

Instructions on the published website/webform may then ask the applicant or customer after the process if the applicant or customer would like to contribute sensitive data. If the applicant or customer agrees, the applicant or customer may be redirected to sensitive data capture system 115, and the signed URL, which contains the unique identifier or token, may be used to identify the applicant or customer and start the out of band sensitive data capture process.

Embodiments may use a device identifier, a browser cookie, a captured timeframe, a geo-location, or other personal information (e.g., the last 4 digits of a data provider's SSN, a mother's maiden name, or a personal identification number (PIN), etc.), to provide a level of assurance that the applicant or customer that is entering sensitive data is the same data provider that initially invoked the system resource (e.g., a loan application/origination system provided by a financial institution) and provided the decisioning data.

In one embodiment, origination system 110 may also cause a QR code to be displayed, or may cause the unique identifier to be communicated by near field communication (NFC), Bluetooth Low Energy (BLE), etc. to an electronic device used by the applicant or customer.

Sensitive data may be anonymized at different levels in accordance with feasibility in order to prevent the sensitive data from being leveraged by malicious actors if it were ever breached. Sensitive data that does not lend itself to anonymization may be encrypted.

Decisioning system 120 may also be provided by the organization and may receive the decisioning data needed to decision the loan application or account opening, and may decision the application. Decisioning system 120 may output its decision on the application, such as approved, denied, or pended.

Matching computer program 130 may be used to match the status for the application from decisioning system 120 and any other information (e.g., approved amount of a loan) with the sensitive data using the unique identifier. Matching computer program 130 may then provide the sensitive data, the application status, and any other information to compliance reporting systems 140, which may provide compliance reporting as is necessary and/or desired.

Figure 2:
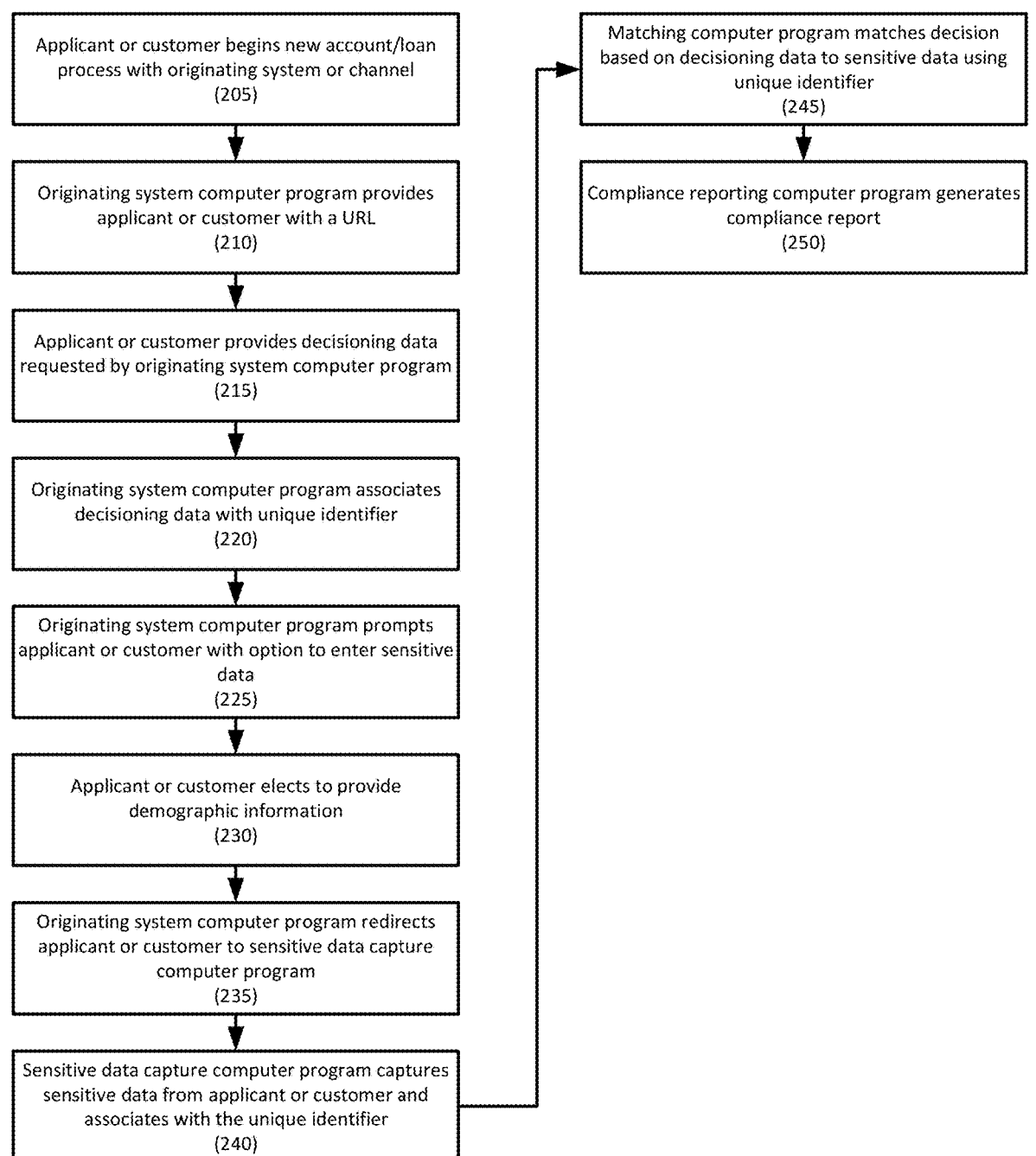
FIG. 2 depicts a method for capture of sensitive data at a private electronic device, in accordance with an embodiment.

Referring to FIG. 2, a system for capture of sensitive data at a private electronic device is provided according to an embodiment.

In step 205, an applicant or customer may begin an application process for a product, such as a loan, an account, etc., with an originating system computer program or channel for an organization, such as a financial institution. In one embodiment, the applicant or customer may interface with the originating computer program system or channel using an electronic device, such as an applicant or customer electronic device, a kiosk for the organization, etc.

In step 210, as part of the application process, the originating system computer program may provide the electronic device with a first URL (e.g., a signed URL), and in step 215, using the electronic device, the applicant or customer may provide the data requested by originating system computer program at the first URL. For example, the applicant or customer may provide decisioning data that is required as part of the application process for the loan, credit card, to open an account, etc.

In step 220, the originating system computer program may receive the decisioning data and may associate the decisioning data with a unique identifier that may be unique to the applicant or customer.

In one embodiment, instead of or in addition to associating the decisioning data with the unique identifier, the originating system computer program may associate the decision on the application (e.g., approve, reject) based on the decisioning data with the unique identifier.

In step 225, the originating system computer program may provide the applicant or customer with an option to enter sensitive data, such as demographic information, and, in step 230, the applicant or customer may elect to enter sensitive data.

In step 235, the originating system computer program may provide the applicant or customer electronic device with a second URL to enter the sensitive data, and in response to receiving the second URL, the applicant or customer electronic device may redirect to the sensitive data capture computer program at the second URL. In one embodiment, the unique identifier may be provided with the second URL.

In step 240, the sensitive data capture computer program may capture the sensitive data for the applicant or customer, and may associate the sensitive data with the unique identifier.

In one embodiment, if any personally identifiable data is captured, the sensitive data capture computer program may anonymize the sensitive data.

In step 245, a matching computer program may receive the sensitive data with the unique identifier from the sensitive data capture computer program, and the decisioning data and/or the results of the decision (e.g., approve or reject, approved loan amount, approved line of credit amount, etc.) with the unique identifier from the originating system computer program, and may use the unique identifier to correlate the sensitive data to the decisioning data and/or the results of the decisioning process.

In step 250, a compliance reporting computer program may receive the matched sensitive data and the decisioning data and/or the results of the decisioning process and then generate compliance reports as is necessary and/or desired.

In embodiments, cryptographic techniques, such as homomorphic encryption, may be used to store and process the sensitive data. For example, homomorphic encryption may be used. Homomorphic encryption allows computations and analytics to be performed on encrypted data. The resultant output is also in encrypted form and, if decrypted, is identical to the results had the processing been done on the unencrypted form of the input data. Accordingly, homomorphic encryption allows sensitive data to be encrypted and processed without the data or the results of the processing being readable by humans.

Homomorphic encryption utilizes public/private key cryptography. Data is encrypted with a public key but can only be decrypted with a corresponding private key. The results of processing encrypted data that is homomorphically encrypted may also be decrypted by the same private key that corresponds to the public key used to encrypt associated input data. Several types or levels of homomorphic encryption exist. These may include, for example, Partially Homomorphic Encryption (PHE), Somewhat Homomorphic Encryption (SHE), and Fully Homomorphic Encryption (FHE). PHE only allows selected mathematical functions to be performed on encrypted data. SHE allows a limited number of mathematical operations up to a certain complexity to be performed, for a limited number of times. FHE allows any kind of mathematical operation to be performed for an unlimited number of times.

In embodiments, a data processing system that provides a collection interface to an applicant or customer may request and receive or retrieve a public key from a sensitive data capture system. The data processing system may encrypt data using the public key retrieved from the sensitive data capture system. After encryption, the data processing system may send the data to the sensitive data capture system.

Additionally, an applicant or customer may receive a URL including the same public key used by the data processing system. The applicant or customer may enter sensitive data into an interface such as a webform or a form provided in an application. The sensitive data entered by the applicant or customer in the form may then be encrypted using the public key (e.g., by a browser or an associated application), and may be sent to the sensitive data capture system.

In embodiments, matching computer program 130 may receive the encrypted data from the data processing system and the encrypted data entered by the applicant or customer. Notably, neither originating system 110 nor the sensitive data capture system 115 may decrypt the data from the other entity since neither entity is in possession of the public key's corresponding private key. Matching computer program 130 may send the encrypted data to compliance reporting system(s) 140 (e.g., for analytics or report processing). In accordance with aspects, matching computer program 130 and/or the compliance reporting systems 140 may store the corresponding private key of the public key used to encrypt the data. Matching computer program 130 and/or compliance computer system(s) 140 may sit and execute in a secure environment, and may decrypt the data in the secure environment and process the decrypted data in the secure environment.

Figure 3:
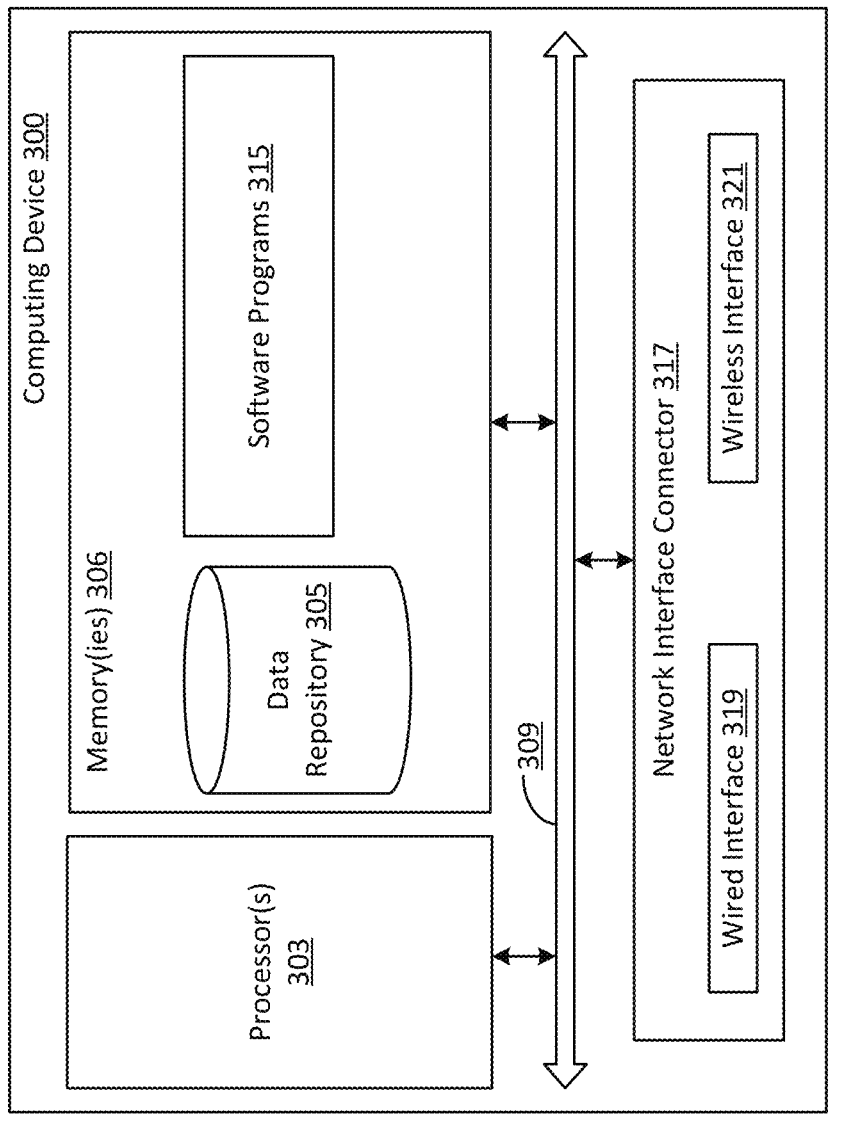
FIG. 3 is a block diagram of a computing device for implementing certain aspects of the present disclosure.

FIG. 3 is a block diagram of a computing device for implementing certain aspects of the present disclosure. Computing device 300 may represent hardware that executes the logic that drives the various system components described herein. For example, system components of an origination system, a sensitive data capture system, an interface, various database engines and database servers, and other computer applications and logic may include, and/or execute on, components and configurations like, or similar to, computing device 300.

Computing device 300 includes a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 300 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine" a "computing device," an "electronic device," a "mobile device," etc. These may be a computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

What is claimed is:

1. A method comprising:
receiving, at an originating system computer program, decisioning data from an applicant as part of an application for a product;
generating, by the originating system computer program, a unique identifier for the applicant;
redirecting, by the originating system computer program, the applicant to a sensitive data capture computer program with the unique identifier;
receiving, by the sensitive data capture computer program, sensitive data from the applicant, wherein the originating system computer program does not have access to the sensitive data;
associating, by the sensitive data capture computer program, the sensitive data with the unique identifier;
receiving, by a matching computer program, a decision on the application from a decisioning system and the unique identifier;
receiving, by the matching computer program, the sensitive data and the unique identifier from the sensitive data capture computer program;
matching, by the matching computer program, the sensitive data and the decision using the unique identifier; and
generating, by a compliance reporting program, a report using the match.

2. The method of claim 1, wherein the decisioning data is received at a first uniform resource locator (URL) and the sensitive data is received at a second URL.

3. The method of claim 2, wherein the originating system computer program provides the second URL in a machine-readable code.

4. The method of claim 1, wherein the decisioning data comprises income information for the applicant.

5. The method of claim 1, wherein the sensitive data comprises a race of the applicant and/or a gender of the applicant.

6. The method of claim 1, wherein the unique identifier comprises a hash of a social security number for the applicant.

7. The method of claim 1, further comprising:
anonymizing, by the sensitive data capture computer program, at least some of the sensitive data.

8. The method of claim 1, further comprising:
encrypting, by the sensitive data capture computer program, at least some of the sensitive data.

9. The method of claim 1, wherein the decision comprises an approval or rejection of the application.

10. The method of claim 9, wherein the decision further comprises an approved loan amount or an approved line of credit amount.

11. The method of claim 1, wherein the application is for a loan.

12. A system, comprising:

an originating system executing an originating system computer program that is configured to receive decisioning data from an applicant as part of an application for a product and to generate a unique identifier for the applicant;

a sensitive data capture system executing a sensitive data capture system computer program that is configured to receive a redirect from the originating system with the unique identifier, to receive sensitive data from the applicant, wherein the originating system does not have access to the sensitive data, and to associate the sensitive data with the unique identifier;

a decisioning system executing a decisioning system computer program that is configured to decision the application based on the decisioning data;

a matching computer program that is configured to receive the decision on the application with the unique identifier from the decisioning system, to receive the sensitive data with the unique identifier from the sensitive data capture system, and to match the sensitive data and the decision using the unique identifier; and a compliance reporting computer program that is configured to generate a compliance report using the match.

13. The system of claim 12, wherein the decisioning data is received at a first uniform resource locator (URL) and the sensitive data is received at a second URL.

14. The system of claim 13, wherein the originating system computer program is further configured to provide the second URL in a machine-readable code.

15. The system of claim 12, wherein the decisioning data comprises income information for the applicant, and the sensitive data comprises a race of the applicant and/or a gender of the applicant.

16. The system of claim 12, wherein the unique identifier comprises a hash of a social security number for the applicant.

17. The system of claim 12, wherein the sensitive data capture system computer program is further configured to anonymize at least some of the sensitive data.

18. The system of claim 12, wherein the sensitive data capture system computer program is further configured to encrypt at least some of the sensitive data.

19. The system of claim 12, wherein the decision comprises an approval or rejection of the application.

20. The system of claim 19, wherein the decision further comprises an approved loan amount or an approved line of credit amount.

* * * * *